United States Patent
Kobayashi

(10) Patent No.: US 10,240,913 B2
(45) Date of Patent: Mar. 26, 2019

(54) THREE-DIMENSIONAL COORDINATE MEASURING APPARATUS AND THREE-DIMENSIONAL COORDINATE MEASURING METHOD

(71) Applicant: CANON KABUSHIKI KAISHA, Tokyo (JP)

(72) Inventor: Toshihiro Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 405 days.

(21) Appl. No.: 14/876,036

(22) Filed: Oct. 6, 2015

(65) Prior Publication Data

US 2016/0102972 A1    Apr. 14, 2016

(30) Foreign Application Priority Data

Oct. 10, 2014    (JP) .................................. 2014-208955

(51) Int. Cl.
*G01B 11/25* (2006.01)
*G01B 11/00* (2006.01)

(52) U.S. Cl.
CPC ............ *G01B 11/25* (2013.01); *G01B 11/002* (2013.01)

(58) Field of Classification Search
CPC ..... G01B 11/002; G01B 11/005; G01B 11/25; G01B 11/2504; G01B 11/2509;
(Continued)

(56) References Cited

U.S. PATENT DOCUMENTS

| 2015/0204662 A1* | 7/2015 | Kobayashi ............. G01B 11/25 356/610 |
| 2015/0310663 A1* | 10/2015 | Yamasaki ................ H04N 9/31 348/136 |
| 2015/0362312 A1* | 12/2015 | Higo ................... G01B 11/2513 356/610 |

FOREIGN PATENT DOCUMENTS

| JP | 2517062 B2 | 7/1996 |
| JP | 2012-251893 A | 12/2012 |

(Continued)

OTHER PUBLICATIONS

Machine translation of JP 2016-003889 A published on Dec. 1, 2016 (Application JP 2014-122744 filed on Jun. 13, 2014), 27 pages.*

(Continued)

*Primary Examiner* — Gordon J Stock, Jr.
(74) *Attorney, Agent, or Firm* — Carter, Deluca, Farrell & Schmidt, LLP

(57) ABSTRACT

The invention makes it possible to measure an object with a three dimensional shape that is made of various materials with a high degree of precision and at high-speed, without requiring a vast amount advance of preparation. A measuring unit detects internal scattering light measuring areas in a captured image, and obtains profiles of internal scattering light components in the areas. An estimating unit estimates the internal scattering light components in three-dimensional coordinate measuring areas based on the profiles of the internal scattering light components in the internal scattering light measuring areas. A reducing unit reduces the internal scattering light components in the three-dimensional coordinate measuring areas to generate a direct-reflected light component image. Then, a calculating unit calculates three-dimensional coordinates on measuring lines based on the direct-reflected light component image.

10 Claims, 7 Drawing Sheets

(58) Field of Classification Search
CPC ............ G01B 11/2514; G01B 11/2518; G01B 11/2522; G01B 11/2527; G01B 11/2531; G01B 11/25365; G01B 11/24; G01B 11/2408; G01B 11/2416; G01B 11/2425; G01B 11/2441; G01B 11/254; G01B 11/2545; G01B 11/2536
USPC .................................................. 356/600–640
See application file for complete search history.

(56) References Cited

FOREIGN PATENT DOCUMENTS

| JP | 5202012 B2 | 6/2013 | | |
|---|---|---|---|---|
| JP | 2015135294 A | * | 7/2015 | ............. G01B 11/25 |

OTHER PUBLICATIONS

Machine translation of JP 2015-210192 A published on Nov. 24, 2015 (Application JP 2014-092001 filed on Apr. 25, 2014), 38 pages.*
Machine translation of JP 2015-135294 A published on Jul. 27, 2015 (Application JP 2014-007271 filed on Jan. 1, 2014), 35 pages.*
Furuse et al., "Robust 3-D Shape Measurement by Modulated Slit Light Against Interreflection and Subsurface Scattering", Meeting on Image Recognition and Understanding (MIRU), Jul. 2009, pp. 214-221.

* cited by examiner

FIG. 7A    FIG. 7B
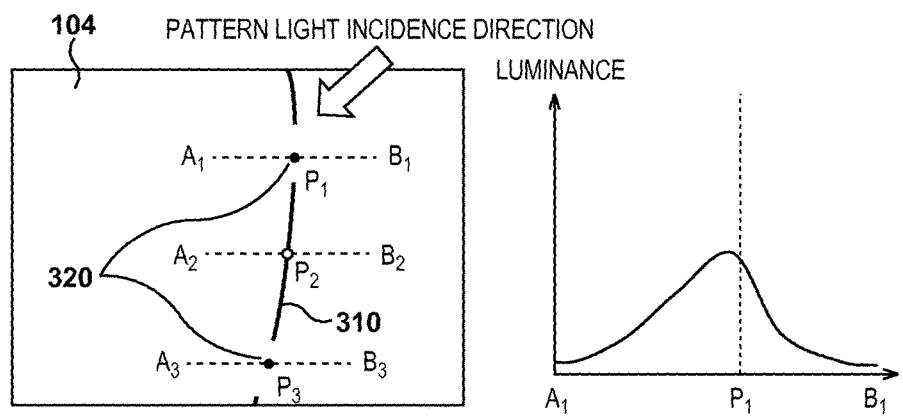
FIG. 7C    FIG. 7D
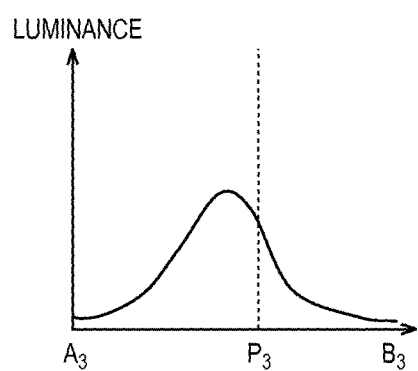
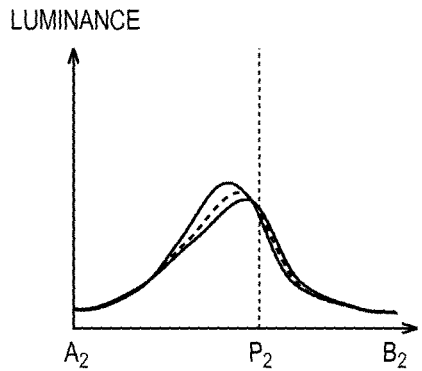

THREE-DIMENSIONAL COORDINATE MEASURING APPARATUS AND THREE-DIMENSIONAL COORDINATE MEASURING METHOD

BACKGROUND OF THE INVENTION

Field of the Invention

The present invention particularly relates to a favorable three-dimensional coordinate measuring apparatus and a favorable three-dimensional coordinate measuring method used to measure the shape of an object that is made up of various materials.

Description of the Related Art

It is widely known that a conventional three-dimensional coordinate measuring apparatus obtains three-dimensional coordinates on the surface of a measuring target by using the triangulation principle on an image obtained by a projection unit such as a projector projecting a stripe pattern, which is typified by a spatial coding method (such as Grey code) and the like, onto the measuring target, and capturing the light that is reflected by the measuring target with an imaging unit. In such an apparatus, there has been an issue in which the degree of precision with which three-dimensional coordinates are measured largely depends on the material of the measuring target.

In the case in which the measuring target is made up of a white colored material or the like whose surface diffusely reflects light and has a high reflectivity, such an apparatus can measure the three-dimensional shape with a high degree of precision and stability. However, the field of industrial production often sees the use of materials that not only reflect light off of their surface, but also allow light to penetrate and scatter internally.

Issues such as a decrease in the degree of measuring precision and measuring being impossible in the first place have occurred due to a phenomenon generally called subsurface scattering or internal scattering that occurs in the measuring target object when measuring the target object with the conventional three-dimensional coordinate measuring apparatus. For this reason, when measuring such a target object, a step such as applying a white-colored powder or the like to the surface of the target object in advance is required. As a result, this has become an obstacle that largely restricts the scope of application of the three-dimensional coordinate measuring apparatus. Thus, measuring apparatuses that perform measuring using various methods have been proposed. Typical examples are disclosed in Japanese Patent No. 5202012 (hereinafter Patent Document 1), Japanese Patent Laid-Open No. 2012-251893 (hereinafter Patent Document 2), Japanese Patent No. 2517062 (hereinafter Patent Document 3), and Robust 3-D Shape Measurement by Modulated Slit Light Against Interreflection and Subsurface Scattering: Furuse. T, Hiura. S, Sato. K, Meeting on Image Recognition and Understanding (MIRU) 2009 (hereinafter, Non-Patent Document 1).

However, in the method described in Patent 1, a peak position is estimated based on the asymmetry of a waveform, but no consideration is made for internal scattering when measuring a translucent object, and thus the effect of correction is limited. Also, in the method described in Patent Document 2, the waveform of a luminance pattern depends not only on the material of the measuring target object, but on many parameters such as the shape of the target object, the geometric relationship between the light source and the light receiving unit, and the like. For this reason, in order to measure a broad range of target objects, a need arose to obtain, in advance, a vast number of reference luminance patterns in order to cover various combinations.

Furthermore, in the method described in Patent Document 3, three-dimensional measuring can be performed at high-speed, but no countermeasures are taken for measuring a translucent object that causes internal scattering, and thus increasing the degree of precision is limited. In the method in Non-Patent Document 1, a long time is required for measuring as there is a need to project many pattern lights and perform imaging in order to measure the entire target object.

SUMMARY OF THE INVENTION

The present invention was achieved in light of the above issues. The present invention provides technology that can measure the three-dimensional shape of an object made of various materials with a high degree of precision and at a high speed without requiring a vast amount of preparation in advance.

According to an aspect of the invention, there is provided a three-dimensional coordinate measuring apparatus comprising: an input unit configured to input a captured image of an object in which internal scattering can occur onto which a pattern that has bright section areas and dark section areas is projected; an estimating unit configured to estimate an internal scattering light component in a first area that corresponds to a bright section area of the projected pattern in the captured image input by the input unit, based on a luminance value of a second area that corresponds to a dark section area of the projected pattern; and a deriving unit configured to derive three-dimensional coordinates of the object based on data of the captured image and the internal scattering light component estimated by the estimating unit.

According to the present invention, the three-dimensional shape of an object made of various materials can be measured with a high degree of precision and at a high speed, without requiring a vast amount of preparation in advance.

Further features of the present invention will become apparent from the following description of exemplary embodiments (with reference to the attached drawings).

BRIEF DESCRIPTION OF THE DRAWINGS

FIGS. 7A to 7D are diagrams for describing processing for estimating internal scattering light.

DESCRIPTION OF THE EMBODIMENTS

First Embodiment

In the present embodiment, pattern light made up of multiple measuring lines is projected onto a measuring target (an object). These measuring lines are constituted by bright sections for measuring three-dimensional coordinates and dark sections for measuring internal scattering light. The apparatus of this embodiment measures internal scattering light components of the measuring target based on multiple areas that correspond to the dark sections of the measuring lines, and based on these components, estimates the internal scattering light components in areas that correspond to the bright sections. Then, by using an image obtained by subtracting the estimated internal scattering light components from a captured image, the apparatus of this embodiment measures the three-dimensional coordinates of the surface of the measuring target with a high degree of precision, without being influenced by the internal scattering light.

Figure 1:
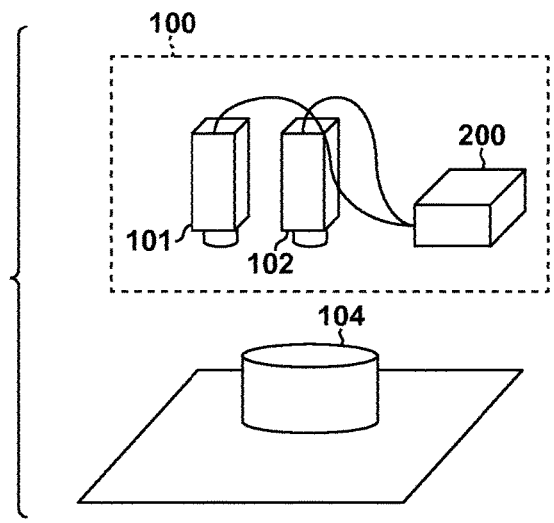
FIG. 1 is a diagram schematically showing an example of an overall configuration of a three-dimensional coordinate measuring apparatus according to an embodiment.

FIG. 1 is a diagram schematically showing an example of the overall configuration of a three-dimensional coordinate measuring apparatus 100 according to the present embodiment. Note that the configuration shown in FIG. 1 is an example and there is no limitation to what is shown. The three-dimensional coordinate measuring apparatus 100 includes a projector 101, an imaging unit 102, and a processing unit 200, and it calculates the three-dimensional coordinates of the surface of a measuring target object 104.

Figure 2:
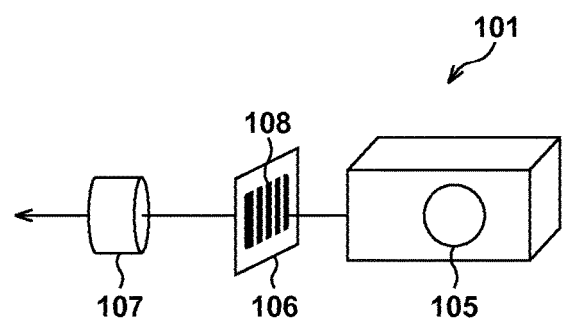
FIG. 2 is a diagram showing an example of a configuration of a projector according to a first and second embodiment.

The projector 101 projects pattern light onto the measuring target object 104. FIG. 2 shows an example of the configuration of the projector 101 according to the present embodiment, and the projector 101 is constituted by a light source 105, a slide 106, and a projection optical system 107. Luminous flux generated by the light source 105 is modulated by a pattern image 108 drawn on the slide 106, is enlarged via the projection optical system 107, and is projected onto the surface of the measuring target object 104. The projected light that is modulated by the pattern image 108 is called pattern light in the descriptions below. The pattern light is reflected by the surface of the measuring target object 104 and is captured as an image by the imaging unit 102.

Figure 3:
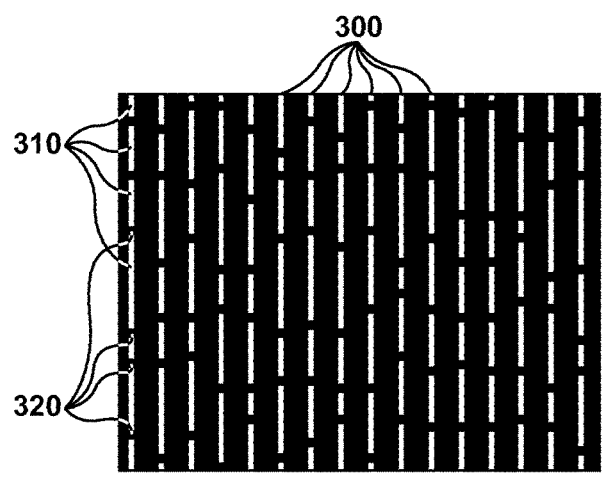
FIG. 3 is a diagram showing an example of a pattern image projected by the projector according to an embodiment.

FIG. 3 is a diagram showing an example of the pattern image 108 projected by the projector 101 according to the present embodiment. In FIG. 3, the areas shown as white are areas (bright sections) in which light is projected onto the measuring target object 104, and the areas shown as black are areas (dark sections) in which light is not projected onto the measuring target object 104. The pattern light shown in FIG. 3 is constituted by multiple measuring lines 300. The measuring lines 300 are each further made up of three-dimensional coordinate measuring areas 310 and internal scattering light measuring areas 320. The measuring lines 300 are each divided into multiple line segments by the internal scattering light measuring areas 320 that constitute dark sections, and the line segments that configure the remaining bright sections are the three-dimensional coordinate measuring areas 310.

This pattern image 108 can be set to various configurations according to demands from a user of the three-dimensional coordinate measuring apparatus 100. For example, as shown in Patent Document 3, the three-dimensional coordinate measuring areas 310 is slit light and the internal scattering light measuring areas 320 are the breakpoints, and the measuring lines 300 can be identified from the captured image by encoding a combination of the two. For this reason, it is possible to measure the three-dimensional shape of the measuring target object 104 based on one type of pattern image 108 and a captured image of the image projected onto the measuring target object 104.

The imaging unit 102 captures the reflected light of the pattern light projected onto the surface of the measuring target object 104 as an image. An image is formed on an image sensor by the reflected light via an imaging optical system, an image is generated based on the strength of the signal detected by the image sensor, and the image is transmitted to an image input unit 202 that is included in the processing unit 200.

The processing unit 200 realizes the processing of principal algorithms of the three-dimensional coordinate measuring apparatus 100 according to the present embodiment using a computer and electric circuits. More specifically, processing is performed to reduce (or eliminate) the influence of internal scattering light in the measuring target object 104 from the captured image obtained by the imaging unit 102, and calculate accurate three-dimensional coordinates.

Figure 4:
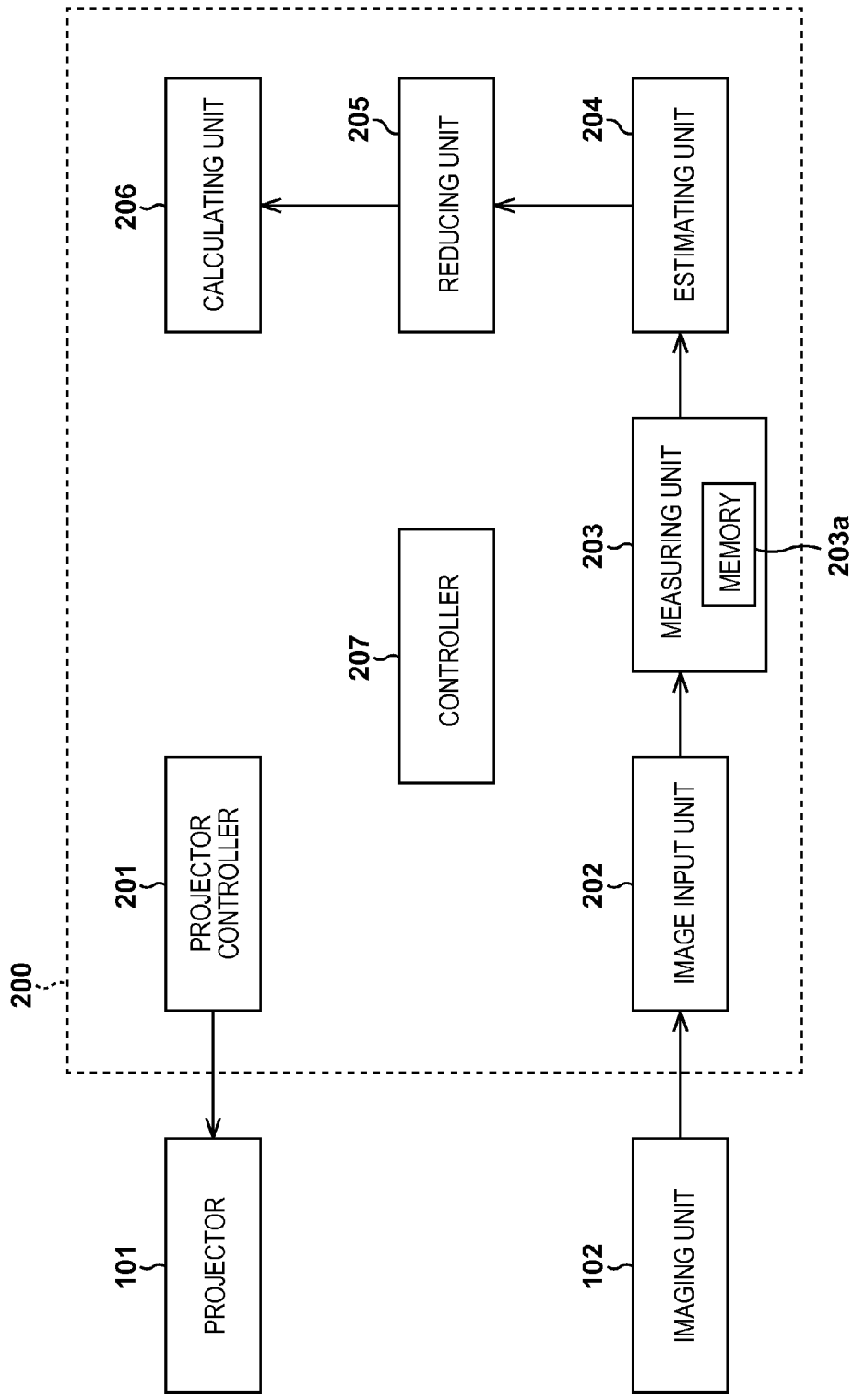
FIG. 4 is a block diagram showing an example of a detailed internal configuration of a processing unit according to an embodiment.

FIG. 4 is a block diagram showing an example of a detailed internal configuration of the processing unit 200.

In FIG. 4, a projector controller 201 performs control of the projector 101. The projector controller 201 of the present embodiment controls projection by transmitting instructions to the projector 101 to start or end projection. Also, a controller 207 controls the processing of the overall processing unit 200, and for example, instructs the imaging unit 102 to perform imaging after projection control has been performed by the projection controller 201. Note that a configuration is possible in which imaging instructions may be made with an operation button or the like belonging to the imaging unit 102 or the processing unit 200 in FIG. 1. The image input unit 202 obtains a captured image by receiving an image of the measuring target object 104 that was captured by the imaging unit 102. Then, the captured image is transmitted to a measuring unit 203.

The measuring unit 203 measures the internal scattering light in the measuring target object 104 that is observed in the captured image. Specific processes will be described below. The measuring unit 203 detects the areas that correspond to the internal scattering light measuring areas 320 in the captured image. For this reason, the measuring unit 203 first extracts the measuring lines 300 from the captured image. This processing is realized by applying a line detection filter such as a Sobel filter to the captured image. In extracting the measuring lines 300, there are cases in which lines are detected as being divided by internal scattering light measuring areas 320 and a continuous line cannot be constructed. In this case, resolving this issue is possible with methods including reducing the influence of the internal scattering light measuring areas 320 by applying a smoothing filter to the captured image in advance, or connecting detected line segments by expansion processing (such as dilate operation) or the like.

Figures 5A, 5B:
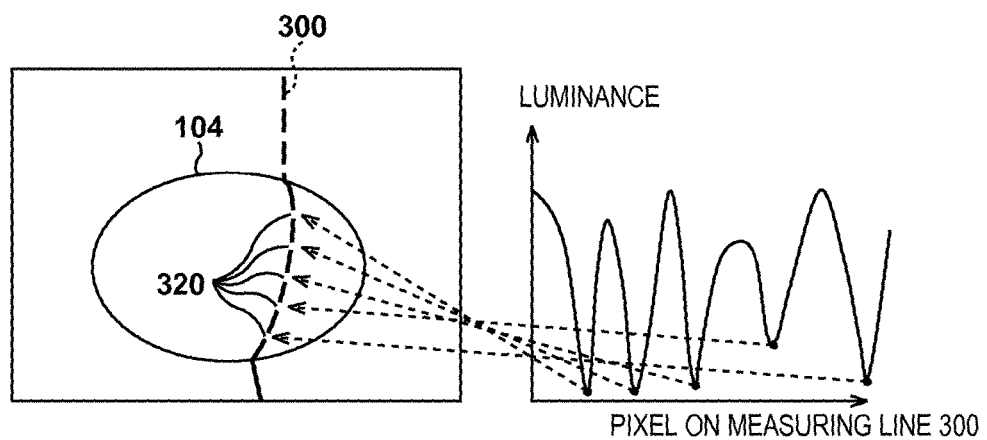
FIGS. 5A and 5B are diagrams for describing changes in pixel luminance on a line segment extracted as a measuring line.

Next, the measuring unit 203 scans the pixels on the line segments extracted as a measuring line 300, and detects the points that have local minimum luminance as the internal scattering light measuring areas 320. FIGS. 5A and 5B show a summary of this processing. Note that in FIG. 5A, the bright sections of the measuring line 300 are illustrated as black and the dark sections are illustrated as white, which is the reverse of FIG. 3, but this is to clearly indicate the measuring line in the captured image in FIG. 5A. In actuality, the three-dimensional coordinate measuring areas 310 in the captured image are the bright sections and the internal scattering light measuring areas 320 are the dark sections.

FIG. 5A is a diagram showing a measuring line 300 (and internal scattering light measuring areas 320) observed on the measuring target object 104 Also, FIG. 5B is a diagram showing luminance along the measuring line 300 shown in FIG. 5A, and shows that the local minimum values of luminance correspond to the internal scattering light measuring areas 320.

Figure 6A:
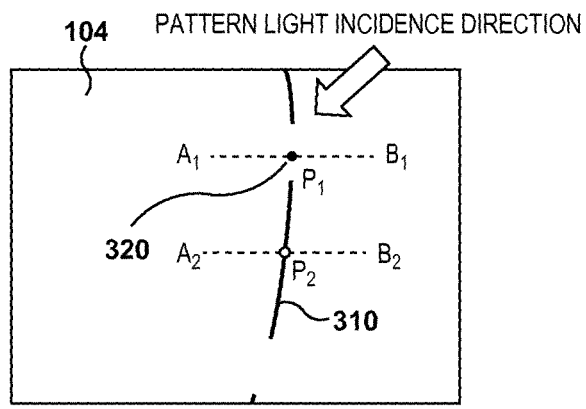
FIGS. 6A to 6C are diagrams for describing the luminance distribution of internal scattering light.
Figure 6B:
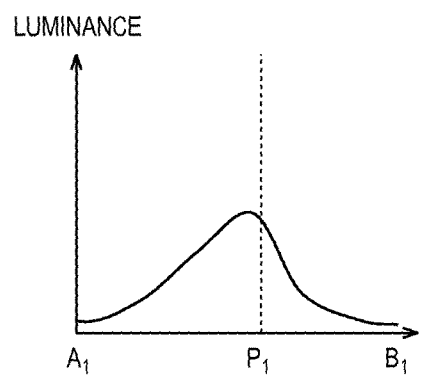
Figure 6C:
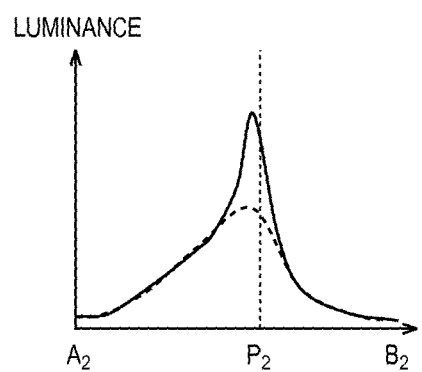

Next, the measuring unit 203 obtains the luminance distribution of neighboring pixels of the detected internal scattering light measuring areas 320 as a profile. FIG. 6A to FIG. 6C are diagrams for describing the luminance distribution of the internal scattering light. FIG. 6A is a partial enlargement of FIG. 5A and shows the appearance of the vicinity of an internal scattering light measuring area 320 on the measuring target object 104.

The vicinity of the internal scattering light measuring area 320 is the dark section of the projection pattern, and therefore can be deemed to be the area onto which the pattern light from the projector 101 is not directly projected. In other words, the luminance value of the vicinity of the internal scattering light measuring area 320 in the captured image can be further deemed to be the result of observing only the internal scattering light that appeared in the periphery (specifically, the three-dimensional coordinate measuring areas 310).

On the other hand, the three-dimensional coordinate measuring areas 310 are the bright sections of the projection pattern, and therefore can be deemed to be areas onto which the pattern light from the projector 101 is directly projected. In other words, the luminance value in the vicinity of the three-dimensional coordinate measuring areas 310 in the captured image can be deemed to be the result of observing pattern light from the projector 101 in addition to internal scattering light that has occurred in the surrounding area.

FIG. 6B shows an example of the luminance distribution on a line segment A1B1 in the vicinity of the internal scattering light measuring area 320 (extending left and right from a point P1). In the example shown in FIG. 6A, in the case in which the pattern light is projected onto the measuring target object 104 from the right, the luminance distribution, as shown in FIG. 6B, is not left-right symmetrical, and is expressed as a waveform that is distorted to the left of the point P1, which is the linear center of the internal scattering light measuring area 320.

Also, FIG. 6C shows an example of the luminance distribution on a line segment A2B2 in the vicinity of the three-dimensional coordinate measuring area 310 (extending left and right from a point P2). The portion indicated by the solid line in FIG. 6C is the waveform that is actually observed, and the portion indicated by the dashed line, which is a portion of the portion indicated by the solid line, indicates a component due to the influence of internal scattering light. In the case where changes in the shape of the measuring target object 104 are locally smooth and the material is approximately uniform, the components due to the influence of internal scattering light in a three-dimensional coordinate measuring area 310 and an internal scattering light measuring area 320 that are adjacent to each other have waveforms that largely resemble each other. Changes to the projected pattern light originate from the fact that the internal scattering acts as a low-pass filter as a physical phenomenon, and the internal scattering light component changes gently.

The measuring unit 203 holds data that indicates the luminance distribution in FIG. 6B in a memory 203a. Then, the measuring unit 203 repeats the internal scattering light measuring processing for multiple internal scattering light measuring areas 320.

An estimating unit 204 estimates the internal scattering components of the three-dimensional coordinate measuring areas 310 based on the internal scattering components in the multiple internal scattering light measuring areas 320 measured by the measuring unit 203. Specific processes will be described below.

FIGS. 7A to 7D are diagrams for describing internal scattering light estimation processing performed by the estimating unit 204. The internal scattering light profiles of line segments A1B1 and A3B3 are obtained at two places, which are the point P1 and a point P3 in the internal scattering light measuring areas 320 shown in FIG. 7A, by the measuring unit 203. The estimating unit 204 estimates the internal scattering light at a point P2 in the three-dimensional coordinate measuring area 310 using these two types of profiles. FIG. 7B shows the profile of internal scattering light in the vicinity of the point P1, and FIG. 7C shows the profile of internal scattering light in the vicinity of the point P3.

In the present embodiment, the estimating unit 204 uses profiles obtained from two internal scattering light measuring areas 320. Specifically, the internal scattering light component of the three-dimensional coordinate measuring area 310, which is between the two internal scattering light measuring areas 320, is estimated by linear interpolation that uses the ratio of the distances between point P1 and point P2 and between point P2 and point P3. In FIG. 7D, the solid lines indicate the internal scattering light components at point P1 and point P3. On the other hand, the dashed line indicates a profile resulting from estimating the internal scattering light component at the point P2 that was obtained by linear interpolation.

The estimating unit 204 repeats the above processing for each pixel in the three-dimensional coordinate measuring area 310, and superimposes the image to a memory region that has the same size as the captured image. As a result of this processing, an internal scattering light component image with the same size as the captured image is generated.

On the other hand, only one internal scattering light measuring area 320 profile is adjacent to an end portion of the three-dimensional coordinate measuring area 310, and therefore the previously described interpolation processing cannot be performed. In this case, the three-dimensional coordinate measuring area 310 may be estimated by extrapolation using the profile of the one adjacent internal scattering light measuring area 320. Also, there are cases where the three-dimensional coordinates measuring area 310 is divided into multiple sections due to gaps, steps and differences in material included in the measuring target object 104. In this case, the individual divided areas of the three-dimensional coordinate measuring area 310 are treated as different areas, and the internal scattering light component of each area may be calculated with the previously described extrapolation processing.

At each point on the three-dimensional coordinate measuring areas 310, a reducing unit 205 obtains a direct light reflection component, from which the influence of the internal scattering light component has been reduced, by subtracting the internal scattering light component estimated by the estimating unit 204 from the image data indicated by the luminance of the captured image. More specifically, a direct light reflection component image is generated by subtracting an internal scattering light component image generated in the estimating unit 204 from the captured image. Alternatively, a configuration is possible in which a direct light reflection component image is not generated for the bright portions, and only values that correspond to the internal light scattering components are held in a memory area that is not shown.

A calculating unit 206 performs processing for calculating three-dimensional coordinates by again extracting the measuring lines 300 from the direct-reflected light component image generated by the reducing unit 205. At this time, a direct-reflected light component is not observed in the pixels corresponding to the internal scattering light measuring areas 320. For this reason, processing such as applying smoothing to the direct-reflected light component image or expanding and connecting an observed measuring line 300 may be performed to estimate the direct-reflected light component in the area. On the other hand, various methods including well-known methods can be applied to calculate the three-dimensional coordinates on the measuring lines 300, and therefore their description has been omitted. Also, in the case in which the direct-reflected light component image is not generated by the reducing unit 205, the three-dimensional coordinates may be calculated by extracting the measuring lines 300 while also subtracting values that correspond to the internal scattering light components from the luminance values of the captured image. In the present embodiment, a direct-reflected light component image is obtained instead of a captured image using a conventional method, and therefore it is possible to calculate three-dimensional coordinates with a high degree of precision without being influenced by the internal light scattering.

Figure 8:
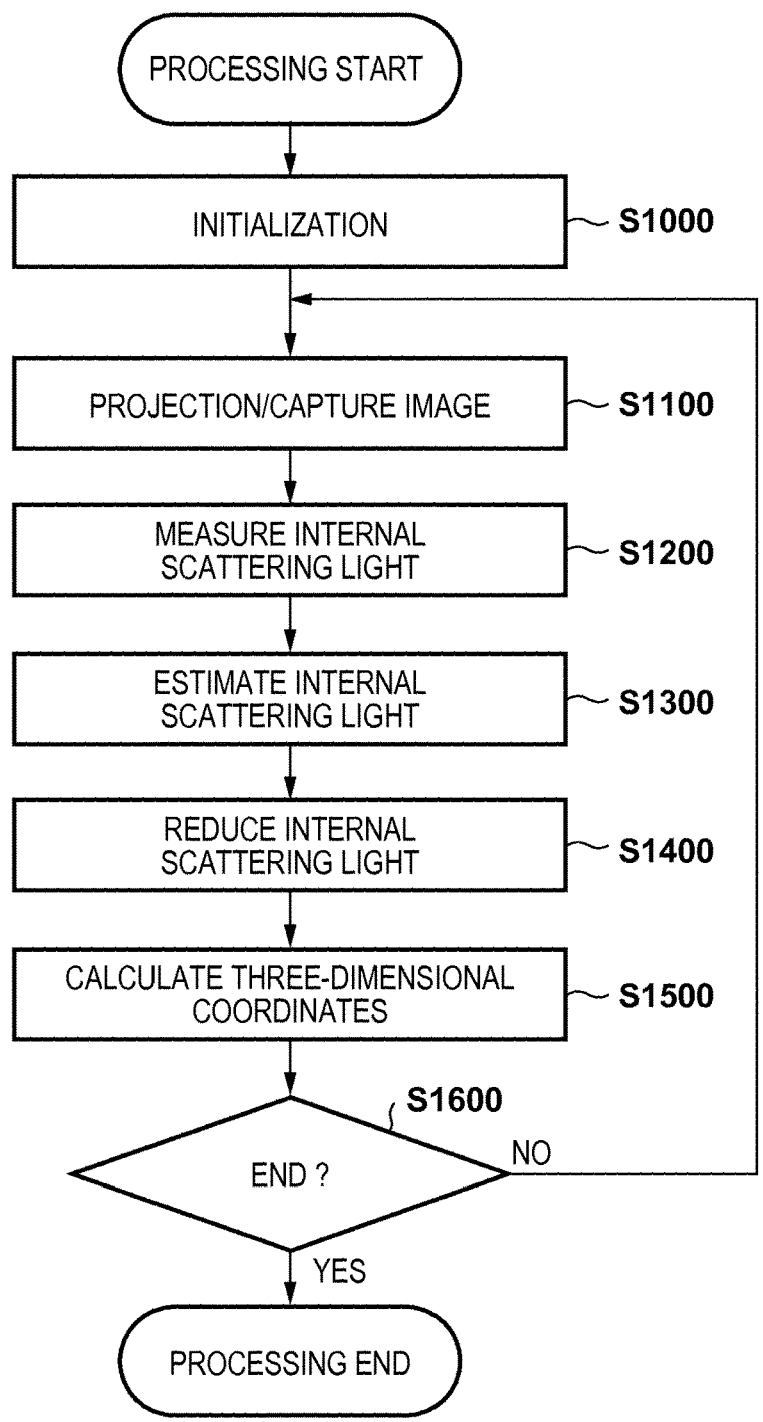
FIG. 8 is a flowchart showing an example of a processing procedure performed by the three-dimensional coordinate measuring apparatus according to an embodiment.

Control in the present embodiment having a configuration such as that of the above is described below. FIG. 8 is a flowchart showing an example of a processing procedure performed by the three-dimensional coordinate measuring apparatus 100 according to the present embodiment.

First, processing is started when the three-dimensional coordinate measuring apparatus 100 is activated, and in step S1000 the controller 207 performs initialization processing. Initialization processing in step S1000 includes processing such as activation of the projector 101 and the imaging unit 102 and setting various types of parameters including calibration data for the projector 101 and the imaging unit 102.

Next, in step S1100, the controller 207 gives a projection start instruction to the projector controller 201. As a result of this, the projector controller 201 drives the projector 101, and the pattern light is projected onto the measuring target 104. Also, the controller 207 outputs a projection instruction to the projector 101, and also performs control of the imaging unit 102 to capture an image of the pattern light projected onto the measuring target object 104. As a result of this, the image of the pattern light from the projection onto the measuring target object 104 is captured by the imaging unit 102, and the captured image is supplied to the image input unit 202.

Next, in step S1200, the controller 207 instructs the measuring unit 203 to detect the internal scattering light measuring areas in the captured image. In response to this, the measuring unit 203 obtains the profiles of the internal scattering light component in the internal scattering light measuring areas of the captured image. In step S1300, the controller 207 instructs the estimating unit 204 to perform estimation processing. As a result of this, the estimating unit 204 estimates the internal scattering light component in the three-dimensional coordinate measuring areas based on the profiles of the internal scattering light component in the internal scattering light measuring areas.

Next, in step S1400, the controller 207 instructs the reducing unit 205 to reduce the internal scattering light component. The reducing unit 205 receives this instruction, reduces the internal scattering light component from the three-dimensional coordinate measuring areas, and performs image generation processing to generate a direct-reflected light component image. Then, in step S1500, the controller 207 instructs the calculating unit 206 to calculate the three-dimensional coordinates on the measuring lines from the direct-reflected light component image. In step S1600, the controller 207 determines whether or not an instruction to end processing has been received based on an instruction from the user. As a result of this determination, in the case in which an instruction to end processing has not been received, the procedure returns to step S1100 and processing is repeated, and in the case in which an instruction to end processing has been received, the processing is ended.

According to the present embodiment as described above, the three-dimensional coordinates are calculated by reducing the internal scattering light component from one captured image of a projected pattern light, and therefore measuring of the three-dimensional coordinates can be performed at high-speed without being influenced by the internal scattering light.

Second Embodiment

An example of generating an optimum pattern image according to characteristics of the measuring target object 104 and measuring conditions in the present embodiment will be described. Accordingly, measuring of the three-dimensional coordinates with a high degree of precision can be performed at high-speed without being influenced by the internal scattering light even in cases of various measuring target objects 104 and various measuring conditions. Only portions in the present embodiment that are different from the first embodiment will be described below.

In the present embodiment, unlike the projector in the first embodiment that projects a fixed pattern, the projector 101 is configured by a projection apparatus that can change the image to be projected, such as a data projector. Specifically, the slide 106 in FIG. 2 is realized by a projection element such as an LCD (Liquid Crystal Display) or a DMD (Digital Mirror Device).

In the present embodiment as well, a pattern image made up of multiple measuring lines 300 similar to those shown in FIG. 3 is projected, which is similar to the first embodiment. However, the optimum pattern image differs depending on various factors such as the material and local shape of the measuring target object 104, the SN (signal-to-noise) ratio of the signal, demands for measuring density and precision, and the like. For this reason the projector controller 201 in this second embodiment performs processing to generate the optimum pattern image giving consideration to multiple conditions, in addition to controlling the projector 101. Also, the projector controller 201 supplies the generated pattern image to the projection element (FIG. 2, reference sign 106) of the projector 101.

The projector controller 201 performs pattern light generation processing in the following manner. In the present embodiment, the parameters required for generating the pattern image that forms the pattern light are the sizes (the number of pixels in the pattern image) of the three-dimensional coordinate measuring area 310 and the internal scattering light measuring area 320 that constitute the measuring line 300.

The projector controller 201 first determines the size of the internal scattering light measuring area 320. The internal scattering light measuring area 320 is determined by the degree of sharpness of the pattern image (i.e., the focal length of the projector 101 and the imaging unit 102) on the measuring target object 104. Specifically, the internal scattering light measuring area 320, which constitutes the dark section, on the measuring line 300 projected onto the measuring target object 104 is set to a size that is to an extent to which the three-dimensional coordinate measuring areas 310, which constitute the bright sections, can be sufficiently separated in a captured image. The user may instruct the size of the internal scattering light measuring area 320, or the size of the internal scattering light measuring area 320 may be set by the processing unit 200 reading the focal length of the projector 101 and the imaging unit 102. Also, the sizes may be set by the controller 207 issuing an instruction to the imaging unit 102 to perform image capturing, and obtaining the degree of sharpness of the captured image that has been transferred to the image input unit 202.

Next, the projector controller 201 determines the size of the three-dimensional coordinate measuring area 310. The size of the three-dimensional coordinate measuring area 310 is determined by the degree of translucence of the measuring target object 104, the amount of noise in the observed captured image, and the size of the internal scattering light measuring area 320. More specifically, it is desirable that the higher the degree of translucence of the measuring target object 104 (the closer to being transparent), the closer the ratio between the size of the internal scattering light measuring area 320 and the size of the three-dimensional coordinate measuring area 310 (e.g., 1:1)

Also, it is desirable that the closer the measuring target object 104 is to being opaque, the larger the three-dimensional coordinate measuring area 310 is relative to the size of the internal scattering light measuring area 320 (e.g., 1:10). Note that if the size of the three-dimensional coordinate measuring area 310 is increased, the size of the internal scattering light measuring area 320 is reduced by a commensurate amount, and the size of the area for which internal scattering light needs to be estimated increases, and therefore the effect of removing the influence of the internal scattering light component becomes restricted.

On the other hand, it is desirable to increase the size of the three-dimensional coordinate measuring area 310 also in cases in which the amount of noise that is observed in the captured image is large. For this reason, the projector controller 201 can determine the size of the three-dimensional coordinate measuring area 310 by receiving information regarding the degree of translucence of the measuring target object 104 and the amount of noise due to operations by the user. Also, the size of the three-dimensional coordinate measuring area 310 may be determined without depending on input from the user by, for example, estimating the degree of translucence of the measuring target object 104 based on a ratio of luminance between the dark sections and bright sections in a captured image that consists of an image of any dark/bright pattern being projected onto the measuring target object 104 by the projector 101. Furthermore, regardless of input by the user, parameters regarding the amount of noise may be read from the imaging unit 102, or the amount of noise may be estimated based on the luminance distribution, etc. of the pixels in the captured image.

Next, the projector controller 201 generates the measuring line 300 so as to approximately maintain the size ratio of the three-dimensional coordinate measuring area 310 and the internal scattering light measuring area 320 that was determined by the above processing. At this time, in order to be able to individually identify the multiple measuring lines 300 observed in the captured image, in each measuring line 300, there are different combinations of positions for the three-dimensional coordinate measuring areas 310 (i.e., the bright sections of the pattern) and the internal scattering light measuring areas 320 (i.e., the dark sections). As a result of this, each individual measuring line 300 included in the pattern image has a unique dark/bright alignment, and the measuring lines 300 can be uniquely identified in the captured image. However, there are cases in which the ratio of the sizes between the three-dimensional coordinate measuring area 310 and the internal scattering light measuring area 320 cannot be locally maintained in order to make each combination of the bright sections and the dark sections of the pattern image unique. In this case, there is a need to change the ratio while also considering the balance between the internal scattering light component removal performance and the range in which the uniqueness of the pattern is guaranteed.

According to the present embodiment as described above, an optimum pattern image is generated according to the characteristics of the measuring target object 104 and measuring conditions. Accordingly, measuring of the three-dimensional coordinates can be performed with a high degree of precision at high-speed without being influenced by the internal scattering light in cases of various measuring target objects 104 and various measuring conditions.

Third Embodiment

In a third embodiment, measuring lines are projected onto the measuring target using a sheet of light triangulation method. Three-dimensional coordinates can be measured with a high degree of precision at high-speed without being influenced by the internal scattering light, similarly to the first embodiment, by modulating sheet light with a pattern image and forming bright sections and dark sections. Only portions in the third embodiment that are different from the first embodiment will be described below.

Figure 9:
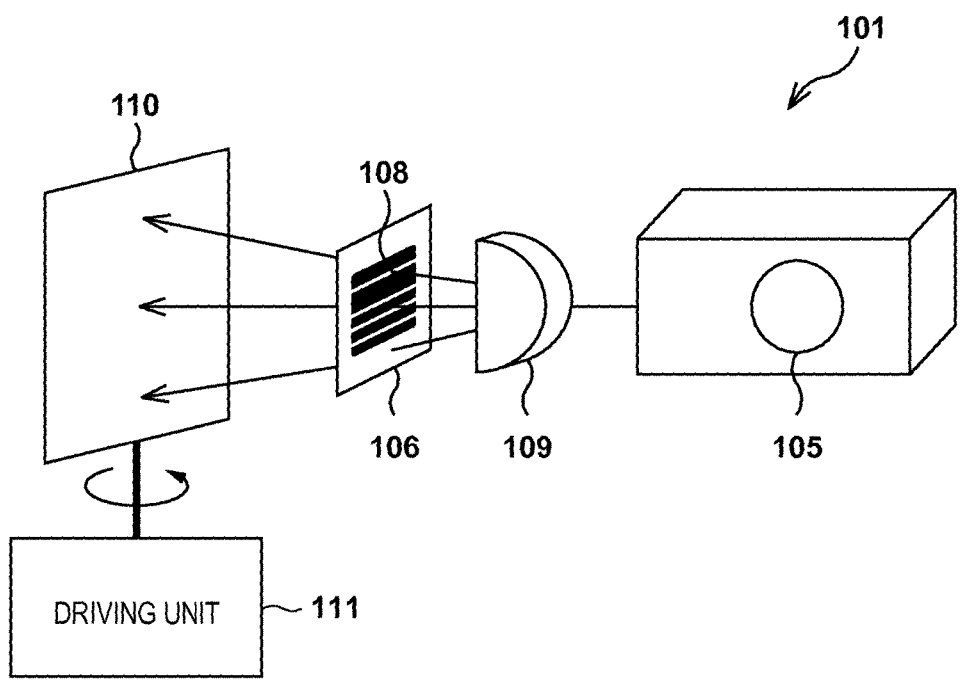
FIG. 9 is a diagram showing an example of a configuration of the projector according to a third embodiment.

FIG. 9 is a diagram showing an example of the configuration of the projector 101 according to the present embodiment. Light generated by the light source 105 is expanded as sheet light by a cylindrical lens 109, which is modulated by the pattern image 108 drawn on the slide 106, and a pattern for the measuring lines 300 is formed. Then, in accordance with the angle of a mirror 110 obtained by a driving unit 111 controlled by the projector controller 201, the light path of the pattern image is changed, and the measuring lines 300 are projected onto the measuring target object 104. As shown in FIG. 5A, at this time one measuring line 300 is observed on the measuring target object 104 in the captured image. The position at which the measuring line 300 is observed is changed with the angle of the mirror 110, and the three-dimensional coordinates of the measuring points are calculated, using triangulation, based on the correlation between the image coordinates of the measuring line 300 and the control angle of the mirror 110. The configuration shown in FIG. 9 is similar to a three-dimensional coordinate measuring apparatus that uses a general sheet of light triangulation, but is different in that the sheet of light is modulated by the slide 106, and the measuring lines 300 that are formed include the three-dimensional coordinate measuring areas 310 and the internal scattering light measuring areas 320.

The projector controller 201 controls the driving unit 111 so that the sheet light emitted from the projector 101 scans the measuring target object 104, and successively controls the angle of the mirror 110. Also, so as to synchronize with the above, the controller 207 instructs the imaging unit 102 to perform imaging according to the rotation angle of the mirror 110. Based on the instruction from the controller 207, the imaging unit 102, transmits the captured image at that instant to the image input unit 202.

In this third embodiment, unlike the three dimensional measuring with a single captured image that is performed in the first embodiment, scanning of a sheet of line is performed using the mirror 110, and therefore there is a need to perform imaging multiple times according to the resolving power of the scan angle. Note that the number of images required for three dimensional measuring is no different from the number needed in the conventional optical cutting method, and a major effect is obtained by being able to realize three-dimensional measuring without being influenced by the internal scattering light just by adding the slide 106 of a conventional configuration.

According to the present embodiment as described above, bright sections and dark sections are formed by the sheet light being modulated by the pattern image in the optical cutting method. Also, by further performing processing similar to that of the first embodiment, measuring of three-dimensional coordinates can be performed with a high degree of precision at high-speed without being influenced by the internal scattering light.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-208955, filed Oct. 10, 2014, which is hereby incorporated by reference herein in its entirety.

What is claimed is:

1. A three-dimensional coordinate measuring apparatus comprising:
   one or more processors; and
   a memory coupled to the one or more processors, the memory having stored thereon instructions which, when executed by the one or more processors, cause the three-dimensional coordinate measuring apparatus to:
   input a captured image of an object, in which internal scattering can occur, onto which a pattern that has bright section areas and dark section areas is projected;
   estimate an internal scattering light component in a first area that corresponds to a bright section area of the projected pattern in the captured image, based on a luminance value of a second area that corresponds to a dark section area of the projected pattern; and
   derive three-dimensional coordinates of the object based on data of the captured image and the estimated internal scattering light component,
   wherein the pattern is constituted by a plurality of measuring lines that are a combination of bright sections and dark sections, and
   wherein in deriving the three-dimensional coordinates of the object, the instructions, when executed by the one or more processors, cause the three-dimensional coordinate measuring apparatus to identify the measuring lines based on a location of the first area or the second area, and calculate three-dimensional coordinates of the object.

2. The three-dimensional coordinate measuring apparatus according to claim 1, wherein the instructions, when executed by the one or more processors, further cause the three-dimensional coordinate measuring apparatus to:
   reduce the estimated internal scattering light component in the data of the captured image, and
   derive the three-dimensional coordinates of the object based on an image from which the internal scattering light component has been reduced.

3. The three-dimensional coordinate measuring apparatus according to claim 1, wherein in estimating the internal scattering light component, the instructions, when executed by the one or more processors, cause the three-dimensional coordinate measuring apparatus to estimate the internal scattering light component in the first area that corresponds to a bright section of the projected pattern using interpolation or extrapolation, based on a luminance value of the second area that corresponds to a dark section of the projected pattern.

4. The three-dimensional coordinate measuring apparatus according to claim 1, wherein in deriving the three-dimensional coordinates of the object, the instructions, when executed by the one or more processors, cause the three-dimensional coordinate measuring apparatus to derive the three-dimensional coordinates by uniquely identifying measuring lines in one captured image.

5. The three-dimensional coordinate measuring apparatus according to claim 1, further comprising:
   a projector configured to project the pattern onto the object; and
   an imaging device configured to generate the captured image by capturing an image of the object onto which the pattern has been projected by the projector.

6. The three-dimensional coordinate measuring apparatus according to claim 5,
   wherein the instructions, when executed by the one or more processors, further cause the three-dimensional coordinate measuring apparatus to generate the pattern, and wherein the projector projects the generated pattern onto the object.

7. The three-dimensional coordinate measuring apparatus according to claim 6, further comprising a projector controller configured to determine a size and a location of the bright section areas and the dark section areas based on at least one of a degree of translucence of the object, a focal length of the projector, a focal length of the imaging device, a degree of sharpness of the captured image, or an amount of noise of the captured image.

8. The three-dimensional coordinate measuring apparatus according to claim 5, wherein the projector performs projecting so as to form an optical line on the object by scanning light including the bright section areas and the dark section areas.

9. A method of controlling a three-dimensional coordinate measuring apparatus, comprising:
   inputting a captured image of an object in which internal scattering can occur onto which a pattern that has bright section areas and dark section areas is projected;
   estimating an internal scattering light component in a first area that corresponds to a bright section area of the projected pattern in the captured image input in the inputting step, based on a luminance value of a second area that corresponds to a dark section area of the projected pattern; and
   deriving three-dimensional coordinates of the object based on data of the captured image and the internal scattering light component estimated in the estimating step,
   wherein the pattern is constituted by a plurality of measuring lines that are a combination of bright sections and dark sections, and
   wherein deriving the three-dimensional coordinates of the object includes identifying the measuring lines based on a location of the first area or the second area, and calculating three-dimensional coordinates of the object.

10. A non-transitory computer-readable storage medium storing a program for, by being read and executed by a computer, causing the computer to function as a three-dimensional coordinate measuring apparatus, the computer executing the program to execute a method comprising:
   inputting a captured image of an object in which internal scattering can occur onto which a pattern that has bright section areas and dark section areas is projected;
   estimating an internal scattering light component in a first area that corresponds to a bright section area of the projected pattern in the captured image input in the inputting step, based on a luminance value of a second area that corresponds to a dark section area of the projected pattern; and
   deriving three-dimensional coordinates of the object based on data of the captured image and the internal scattering light component estimated in the estimating step,
   wherein the pattern is constituted by a plurality of measuring lines that are a combination of bright sections and dark sections, and
   wherein deriving the three-dimensional coordinates of the object includes identifying the measuring lines based on a location of the first area or the second area, and calculating three-dimensional coordinates of the object.

* * * * *